(12) United States Patent
Steggles

(10) Patent No.: US 6,718,278 B1
(45) Date of Patent: Apr. 6, 2004

(54) LOCATION SYSTEM

(75) Inventor: Peter Joseph Steggles, Cambridge (GB)

(73) Assignee: AT&T Laboratories Cambridge Limited, Cambridge (GB)

( * ) Notice: Subject to any disclaimer, the term of this patent is extended or adjusted under 35 U.S.C. 154(b) by 0 days.

(21) Appl. No.: 09/719,300

(22) PCT Filed: Jun. 11, 1999

(86) PCT No.: PCT/GB99/01858

§ 371 (c)(1),
(2), (4) Date: Dec. 11, 2000

(87) PCT Pub. No.: WO99/64887

PCT Pub. Date: Dec. 16, 1999

(51) Int. Cl.[7] ................................................. G06F 15/00
(52) U.S. Cl. .................. 702/150; 342/357; 324/331; 340/573; 367/117
(58) Field of Search ........................ 702/150; 342/357; 324/331; 340/573; 367/117

(56) References Cited

U.S. PATENT DOCUMENTS

| | | | | |
|---|---|---|---|---|
| 4,225,953 A | * | 9/1980 | Simon et al. | 367/117 |
| 4,598,275 A | * | 7/1986 | Ross | 340/573 |
| 4,814,711 A | * | 3/1989 | Olsen et al. | 324/331 |
| 5,218,344 A | * | 6/1993 | Ricketts | 340/573 |
| 5,781,150 A | * | 7/1998 | Norris | 342/357 |
| 5,848,373 A | * | 12/1998 | DeLorme et al. | 701/200 |
| 5,872,539 A | * | 2/1999 | Mullen | 342/357 |
| 6,211,820 B1 | * | 4/2001 | Zou et al. | 342/357.1 |
| 6,338,011 B1 | * | 1/2002 | Furst et al. | 701/1 |
| 6,392,692 B1 | * | 5/2002 | Monroe | 348/143 |
| 6,414,293 B1 | * | 7/2002 | Oliver | 250/208.1 |

FOREIGN PATENT DOCUMENTS

| | | | | |
|---|---|---|---|---|
| EP | 766098 | | 4/1997 | |
| GB | 2 265 038 A | * | 8/1993 | ........... G08B/25/00 |
| GB | 2265038 | | 9/1993 | |
| GB | 2298098 | | 8/1996 | |
| GB | 2320089 | | 6/1998 | |
| GB | 2 320 089 A | * | 10/1998 | |
| WO | 95/27963 | | 10/1995 | |
| WO | 97/01154 | | 1/1997 | |
| WO | 97/14048 | | 4/1997 | |

* cited by examiner

*Primary Examiner*—John Barlow
*Assistant Examiner*—Aditya Bhat

(57) ABSTRACT

A location system for objects having location devices (16) as a means for repeatedly interrogating the location devices on each object to provide position signals. A means (18) to detect the position signals are provided. The position of each object and the area associated with each object are determined from the position signals and stored. The system is then able to determine the relative locations of the thus determined objects and associated areas.

21 Claims, 3 Drawing Sheets

Maximal cover of space around workstation

Maximal cover of space around person

LOCATION SYSTEM

This invention relates to a location system and, in particular, to a system which can be used to support personalisation and mobility in typical office environments and in particular to systems of the type disclosed in our British Patent Application No. GB-A-2320089.

It is desirable in a system such as a computer network to have information about location of all the equipment attached to the network and also information about the locations of people using the network and their particular needs at any given time. Usually, the people using the network are mobile but the equipment S fixed. However, in systems such as radio networks, portable equipment can be part of the network and communicates with the network by radio, and even in wired networks equipment can usually be moved around or rotated.

Location systems give absolute information about the locations of objects in space. Typically, the users of information systems are interested in relative location information. This must be derived from the absolute information about objects and persons in space which is the primary data generated by a location system. For example, the sentences "the person is at position p" and "the workstation is at position q, facing in direction d" give absolute location information. However, "the person at position p is able to use the workstation at position q" gives relative location information. In order to make a location system valuable to the users of information systems such as computer networks, a method of deriving relative location information from absolute location information is required.

A preferred embodiment of the present invention enables relative Location information to be derived from absolute location information by expressing the relative location information in terms of spatial containment and overlapping relationships. These can be calculated using absolute location information. For example, to determine the truth of the sentence "the workstation can be used by the person", a shape c is used to represent the area of space in which the workstation can be used, and another shape p to represent the person. We can then say that the workstation can be used by the person if, and only if, the space c contains the space p. By using this absolute location information to fix the locations of c and p, the truth value of the relative location sentence can then be determined.

In practice, it is necessary to monitor movements of people and objects so that the system can be notified whenever some relative location information becomes true or false. For example, it is necessary to be notified whenever the person p moves into or out of the space in which he can use the workstation c. If there were, for example, 1000 objects such as workstations attached to a network, each of which has an associated area of space, whenever a person moves there are potentially 1000 relative Location statements which could become true or false. To evaluate the truth values of all these statements by calculating the associated containment relationships each time a person or object moves would be too expensive in terms of computing power and a method of indexing the spaces is required so that large numbers of containment relationships can be calculated cheaply. The invention is defined in the appended claims to which reference should now be made.

A preferred embodiment of the invention will now be described in detail by way of example with reference to the figures in which.

Figure 1:
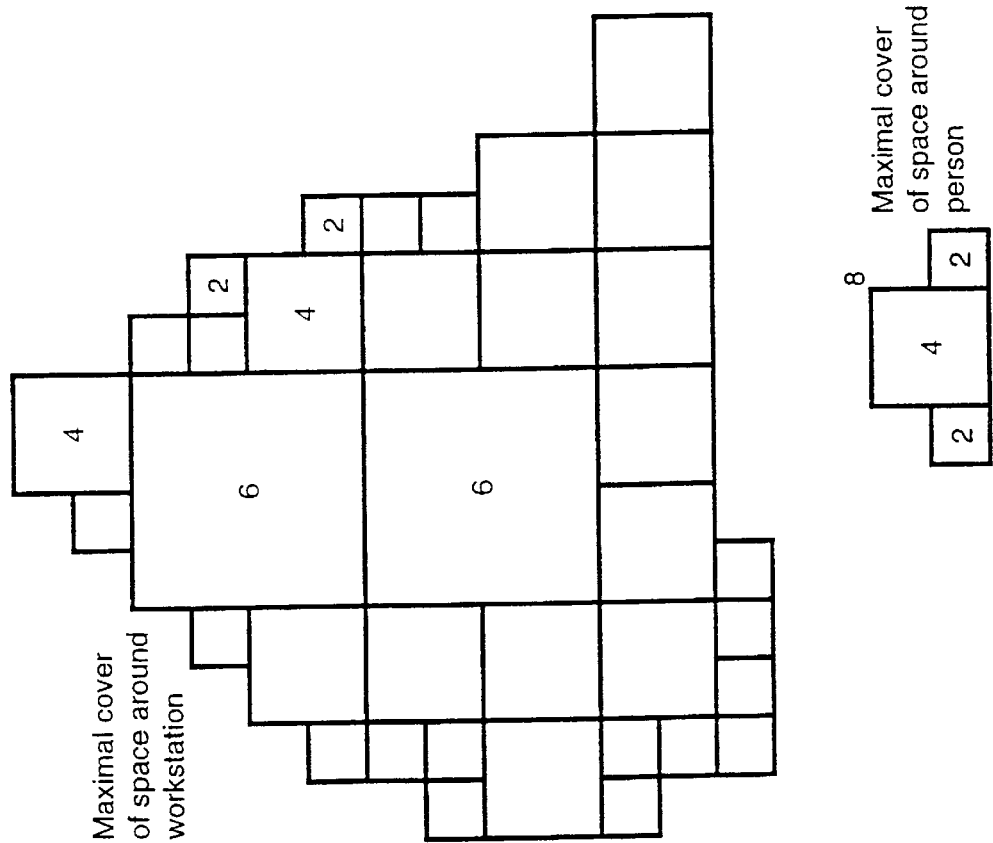
FIG. 1 shows the spaces surrounding a workstation and person represented in a quad tree structure.

A preferred embodiment of the present invention operates by using a containment index in a system whereby spaces can be inserted, moved or deleted in a tree structured store. The process of insertion, movement or deletion of spaces is termed an operation on the store. Whenever an operation is performed on the store, four kinds of events are generated. These are as follows:

i) positive containment events which are generated for all pairs of spaces s and s' where s now contains s' and did not before the last operation on the store;

ii) negative containment events which are generated for all pairs of spaces s and s' where s does not now contain s' and did before the last operation on the store;

iii) positive overlapping events which are generated for all pairs of spaces s and s' where s now overlaps s' and did not before the last operation on the store;

iv) negative overlapping events which are generated for all pairs of spaces s and s' where s does not now overlap s' and did before the last operation on the store.

The value of using a containment index lies in the fact that an individual operation on the store can be done in time largely independent of the number of spaces in the store whilst still calculating all the changes in value of the containment and overlapping relationships between spaces in the store. Therefore, the time taken to calculate the truth values of the relative statements would be fairly constant whether there were 100, 1000 or 10000 workstations in a system.

The indexing process operates by representing spaces in what is known as a quad tree. This is a known data structure in which a space is broken down into squares approximating the space. Initially, this can be thought of as defining a minimum size of square and representing the shape using these squares and then replacing the small squares with larger squares wherever this is possible so that maximal cover of the space is defined with the smallest number of squares or quad tree cells, as they are known, which covers the whole of he area. This is called maximal cover because i- contains the largest cells necessary to cover s. Indexing of the spaces can then be based on two theorems about the maximal cover of the spaces.

The maximal cover of a polygon Is generated in the following manner.

Suppose we have some suitably large quadtree of extending from a bottom left-hand extreme of (0,0) to a top-right-hand extreme of (n−1, n−1), where n is a suitably large power of 2. The maximal cover of a space is essentially an approximation to the space in terms of quadtree cells. This section describes how to generate the maximal cover of an arbitrary polygon containing only cells in the quadtree which are at least as large as r×r (which is some power of 2 less than 2-to-the-n).

Incidentally, this points to a further benefit of our approach on that we can trade off accuracy against performance by merely varying the value of r—bigger values give smaller numbers of cells in the maximal covers which results in faster performance (but worse accuracy). 30 First, find the smallest cell, of size bigger than at least r×r, in the quadtree which completely contains the space to be indexed. This can be done by the following method:

1. Find the point (xmin, ymir, where xmin is the smallest value of the x coordinate for any vertex in the sequence of vertices defining the polygon, and similarly ymin is the smallest value of the y coordinate for any vertex in the sequence of vertices defining the polygon.

2. Find the point (xmax, ymax), where xmax is the greatest value of the x coordinate for any vertex in the sequence of vertices defining the polygon, and similarly ymax is the greatest value of the y coordinate for any vertex in the sequence of vertices defining the polygon.

3. The quadtree cell q0, of size r×r which contains (xmin, ymin) is the square whose bottom left-hand point is at coordinates (xmirn*(xmin/r), ymin*(yrin/r)), and whose top right-hand point is at coordinates (xmin*(xmin/r)+r−1, ymin*(ymirn/r)+r−1).

4. Now we can perform the following process (expressed in pseudocode) which will set Q to be the smallest quadtree cell which completely contains the space to be covered:

q0
while Q does not contain he point (xmax, ymax) do
    Q:=the parent quadtree cell of Q.

Having found a cell in the quadtree which completely contains the space to be indexed, we can generate the smallest set of quadtree cells of size greater than or equal to r which completely covers the given space. This can be done by the following method:

We first define the notions of containment and overlapping for polygons and quadtree cells. A polygon p contains a quadtree cell q if and only if p contains an arbitrary point in q (this can be calculated using a standard algorithm) and no line in the perimeter of p intersects a line in the perimeter of q (this can be calculated using a standard algorithm). A polygon p overlaps a quadtree cell q if and only if some line in the perimeter of p intersects a line in the perimeter of q, or q contains p.

An arbitrary polygon p and quadtree cell q may therefore be related in one of three ways: p contains q, p overlaps q or p is disjoint from q (this last case obtaining when p neither overlaps nor contains q).

Now call the space to be indexed P and consider a variable Q whose value is initially set to be the minimal cell in the quadtree which completely contains P. We generate the maximal cover of P by recursively splitting up the quadtree cell Q into a set of descendant quadtree cells as follows:

Assume there is a set S which will be built up into the maximal cover of P. This set is initially empty. Note that 0D we know hat P overlaps Q initially, because Q contains P.

Note also that each quadtree cell a has 4 children, which we call q0, q1, q2 and q3. We generate the set S using the recursive procedure generate, which is expressed in psuedocode as follows:

```
generate (q: quadtree cell) is
if P contains q then
    S: = S U {q} else if P overlaps q then
    if q is smaller than 2r x 2r
    then
        S: = S U {q} else
        generate (q0)
        generate (q1)
        generate (q2)
        generate (q3)
    end if
end if.
```

The procedure call generate (Q) will terminate with the set S containing all the quadtree cells and only the quadtree cells in the maximal cover of P.

A space, such as the area surrounding a workstation, is shown in FIG. 1 represented with maximal cover from a quad tree. In this, the workstation area is divided into three sizes of squares labelled 2, 4, and 6. Not all of the squares are labelled in the Figure. The Total space represents the area in which the workstation is useable. A person 8 is shown also formed of quad tree squares. In this example, the person is presently outside the useable area for the workstation, i.e., the screen region. The indexing method used for finding the relative locations of objects is based on two theorems about the maximal covers of spaces. These are:

i) The containment indexing theorem: this states that a space s s contained in a space t if, ant only if, for each cell in the maximal cover of s, there exists exactly one cell In the maximal cover of space t which contains x or is equal to x.

ii) The overlap indexing theorem: spaces s and t overlap if and only if there exists two cells x and y in the maximal covers of s and t respectively such that x is equal to y or x contains y, or y contains x.

Suppose that we have implemented a function called index which calculates the maximal cover of any space. To index spaces in a tree, we maintain a representation of the quadtree where each node is annotated with the set of indexed spaces whose index contains that node. To index a space s we calculate the nodes in index s and add s to the annotation of each node. The function indexed returns the set of indexed spaces for any node in the quadtree, and the function index count returns the number of cells in the index of a space (i.e., index_count=#(index s)).

From the containment indexing theorem, we can see that given spaces t and s, if s is contained in t then each cell in index s is a descendant of exactly one cell in index t; so, if we search each of the trees rooted at a cell of index t we should visit each member of index s exactly once.

If we maintain an associative array count to count the number of times we visit a space we can calculate the set of "contained" spaces contained by t by searching each of the trees rooted at a cell of index t and for each cell y that we visit, incrementing the value of count[s] for each space s in indexed y, and returning those spaces s for which count[s]= index_count s. The algorithm can be expressed in this pseudocode:

```
count:=Ø
contained:=Ø
foreach x ∈ index t
    foreach y ∈ descendants x
        foreach s ∈ indexed y
            count[s]:=count[s]+1
            if count[s]=index_count s then
                contained:=contained U {s}
```

We can use a similar algorithm to calculate the set of "contained" spaces which contain the space t, this time by touring the ancestors of t:

```
count:=Ø
containers:=Ø
foreach x ∈ index t
    foreach y ∈ ancestors x
        foreach s ∈ indexed y
            count[s]:=count[s]+1
            if count[s]=index_count t then
                containers:=containers U {s}
```

From the overlap indexing theorem, we can see that given spaces t and s, if s overlaps t then some cell in index s is either a descendant or an ancestor of some cell in index t; so, if we search each of the trees rooted at a cell of index t and all of the ancestors of index t we should visit some member of index s. We can express the algorithm in this pseudocode:

```
overlapped:=Ø
foreach x ∈ index t
    foreach y ∈ ancestors x U descendants x
        foreach s ∈ indexed y
            overlapped:=overlapped U {s}.
```

An optimisation is to calculate all three values as part of the insertion and deletion process. The changes in the values when a space is moved can be calculated by deleting the space at the old position and inserting the space at the new position. The deletion operation generates the sets contained, containers and overlapped; the insertion operation generates the sets contained', containers' and overlapped'.

So when a space s moves, the positive and negative containment and overlapping events can be generated by evaluating the following expressions:

contained—(contained n contained') is the set of all spaces which have stopped being contained by s;

contained'—(contained n contained''') is the set of all spaces which have just become contained by s;

containers—(containers n containers') is the set of all spaces which have stopped being containers of s;

containers'—(containers n containers') is the set of all spaces which have just become containers of s;

overlapped—(overlapped n overlapped') is the set of all spaces which have stopped overlapping s;

overlapped'—(overlapped n overlapped') is the set of all spaces which have just started overlapping s.

Figure 2:
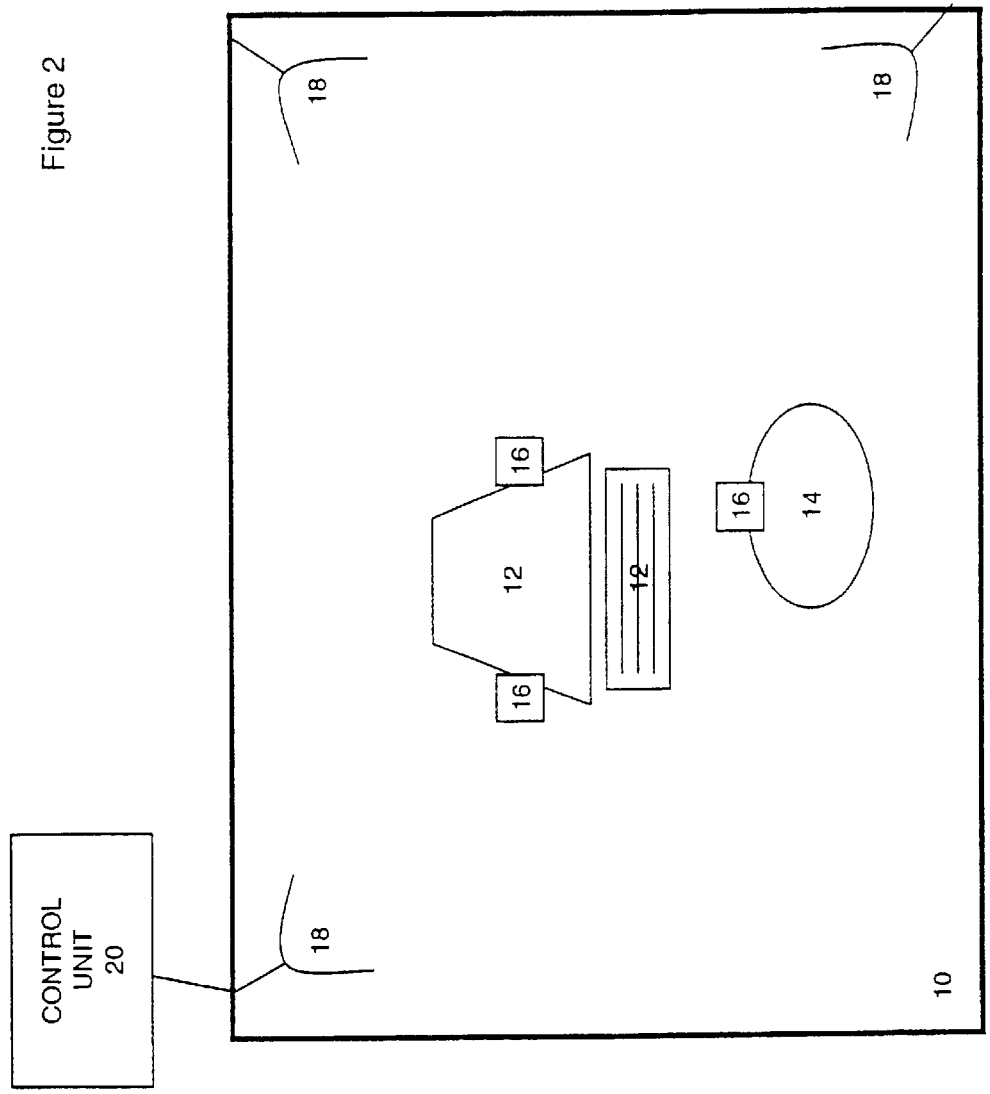
FIG. 2 shows a room containing a workstation and person In an embodiment of the invention.
Figure 3:
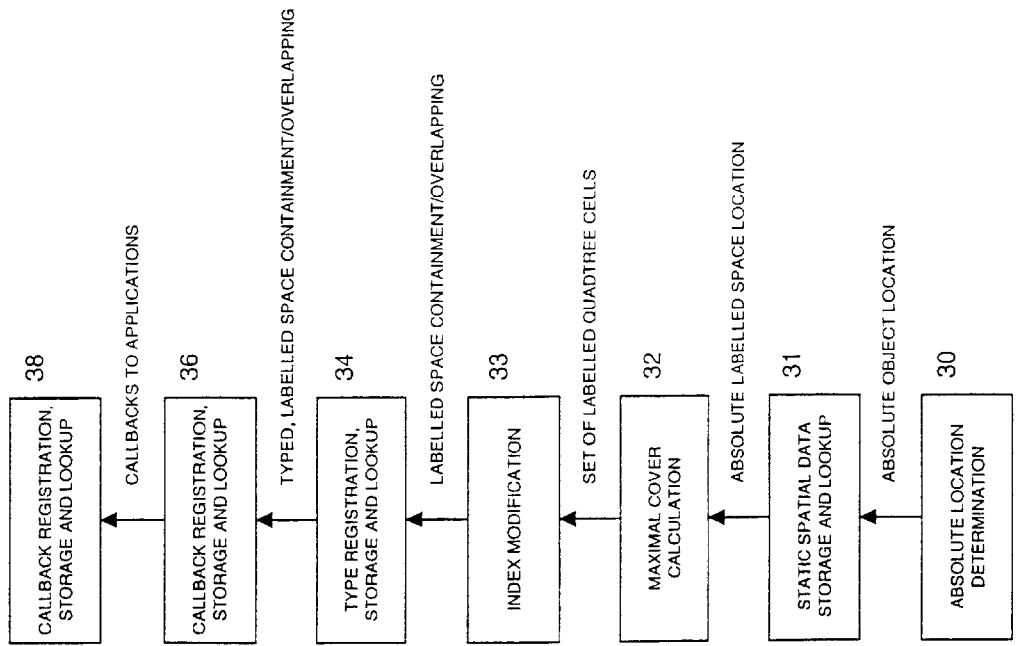
FIG. 3 shows a flowchart showing the steps performed in an embodiment of the invention.

FIG. 2 shows physically how the system might operate. It represents the inside of a room 10 which contains a workstation 12 and a person 14. Fitted to either side of the workstation 12 are position indicators 16 which send signals identifying uniquely each posit on indicator. A position indicator is also attached to the person 14.

Signals transmitted by the position indicator 16 are detected by a number of sensors 18 located in the room. These may be ultrasonic detectors which interrogate indicators on objects and people at regular intervals. Position is computed trigonometrically from the time taken for signals to reach the sensors 18. Signals detected can then be sent back to a control unit 20 associated with the computer network. Thus, the absolute location information of the indicator 16 is derived from the sensors 18 by the control unit 20 which is able to use this for detecting whether or not e.g., the person is in an area which enables him sitting in it to use the workstation 12.

The control unit will preferably poll the sensors 18 to transmit interrogation signals one at a time to the position indicators. Each position indicator in the room will respond by sending a response back to the sensor. The distance of the object from the sensor can then be determined from the total time taken for a response to arrive after the interrogation signal has been transmitted. The Interrogation signal may be a broadcast signal to all position indicators. However, this may lead to contention in the responses. It is therefore preferably directed to each position indicator one at a time using an identifier for that position indicator.

To get an accurate position signal, responses are required at three sensors at different locations.

Positions can be determined for any number of position indicators and may be determined in either two or three dimensions.

The position indicators 16 are also carried by people moving around in the building between rooms such as room 10 which have workstations or other equipment connected to the computer network located within them. Typically, these sensors on people will be interrogated more regularly than the sensors on workstations.

At the control unit 20, the information from the position sensors is used to represent the workstation space and a person space and the space associated with any person in the room 10 in a form similar to that shown in FIG. 1.

These typed containment events can then be used by the computer network to deliver application software as necessary. For example, a software application can be given a designation called "Follow Me". The user of that application can then move from workstation to workstation throughout a building and when he becomes close to or moves into the accessible area of a particular workstation, the application will be loaded to that workstation and he can continue to use the application. The callback registration storage and lockup step 36 uses the typed containment events and contacts the appropriate applications with the relevant relative location information, thereby enabling the system to support mobile personalised software applications in box 38.

This describes a test system in which the indexing system is used to provide "Follow Me" X computer sessions.

A user has an X Window System desktop running on an XRFB server. RFB stands for "remote frame buffer". The XRFB server sends low-level display information to a remote machine running an RFB display server and receives keyboard and mouse input from that machine. This enables a person to use that remote machine as though it is running their X desktop locally. There is a control interface on the XRFB server which enables an application to change the remote display server to which the XRFB server sends low-level display information and from which it receives keyboard input; using this interface an application can control where the physical view of an X desktop is located.

There are several machines running RFB display servers. Each of these machines is tracked by an ultrasonic location system of the type discussed above which Generates a stream of location and orientation events for each of the machines. For each machine these events are translated into a stream of location and orientation events for a space which represents the space around the machine in which the screen is readable. A person is also tracked by the ultrasonic location system, which generates a stream of location and orientation events for the person. These events are translated into a stream of location and orientation events for a small space which contains the person. Whenever any of these spatial location and orientation events occurs, the corresponding space is indexed (reindexed) in the spatial index at its new position.

The application which provides mobile X desktops registers for a callback whenever the area around a person becomes completely contained by the area in which a machine's screen is visible. When this happens, the Follow Me application is called back by the spatial index with the information about which machine's screen area the person has moved into. The application sends a command to the XRFB server to send display output to, and receive keyboard and mouse input from, the machine whose screen area the person has moved into.

The application which provides mobile X desktops also registers for a callback whenever the area around a person ceases to overlap the area in which a machine's screen is visible. When this happens, the Follow Me application is called back by the spatial index with the information about which machine's screen area the person has ceased to overlap. The application sends a command to the XRFB server to stop sending display output to, and receiving keyboard and mouse input from, the machine whose screen area the person has moved away from. (The reason for using positive containment and is negative overlapping events is that this provides a degree of hysteresis, thus avoiding undesirable behavior when a person stands on the boundary of a display area).

Using this system we can see that as a person walks up to a machine, his X desktop will physically appear on that machine and as he walks away his desktop will disappear again.

The indexing system could be used in any application which needs to evaluate spatial containment and overlapping relations in real time. Apart from support for mobile applications, which we have described here, other possible applications involve navigating remote-controlled vehicles around complex environments and any other systems which would benefit from this type of evaluation.

Other example applications involve spaces which are not in the real world such as support for detecting when objects stand in some relation to each other in a shared virtual environment or a video game (e.g., performing collision detection for complex shapes).

Thus, it will be appreciated that a location system of the type described above can be extremely useful in network systems where it is desirable for people to have access, to the network from more than one location. The ability of the embodiment of the invention to load un personalised application software onto a terminal will lead to a significant reduction in logging on time to workstations. Clearly, when a person comes into the useable area, the system can be configured to automatically log-in as that person. Furthermore, when he moves away, it can be made to automatically log-out, thus improving on the security problems associated with conventional workstations where users have to physically log-in and log-out and a user who does not log-out but moves away from his workstation leaves possibly confidential information available to other persons.

What is claimed is:

1. A method for determining whether interaction may occur between objects, at least some of which include a position indicator, said method comprising the steps of:

associating a predefined area with each of said objects; and repetitively determining whether a predetermined relationship between the areas of said objects is fulfilled, wherein this step of determining comprises repeatedly executing the sub-steps of:

(a) determining location of each of the objects that has said position indicator;

(b) determining location of the area associated with each object whose location is determined in step (a), from location of its associated object;

(c) storing the area data for each object whose area is determined in step (b); and (d) evaluating the predetermined relationship between the areas associated with each object, using the stored associated area data, to determine whether or not interaction may occur.

2. A method according to claim 1, wherein the predetermined relationship between areas is the containment of one area by another.

3. A method according to claim 1, wherein the predetermined relationship between areas is the failure of one area to contain another area.

4. A method according to claim 1, wherein the predetermined relationship is the overlapping of one area by another area.

5. A method executed in a computer comprising the steps of:

(a) for a first object of a plurality of objects, obtaining an interaction space, within a base space, that is associated with said first object, the interaction space defined as a set of squares in a hierarchical tree of squares;

(b) for a second object of said plurality of objects, computing an interaction space within said base space that is associated with said second object and which follows movement of said second object, the interaction space defined as a set of squares in a hierarchical tree of squares;

(c) determining a spatial relationship between said first object and said second object by comparing said interaction space of said first object with said interaction space of said second object, and assessing whether said interaction space of said first object overlaps contains, or is contained by said interaction space of said second object, which corresponds to a non-null logical intersection between said interaction space of said first object and said interaction space of said second object with a goal of establishing a non-null working relationship between said first object and said second object; and (d) repeating steps (b) arid (c).

6. The method of claim 5 where said obtaining in step (a) is accomplished by retrieving said interaction space from memory, or by computing said interaction space.

7. The method of claim 5 where said space is a two dimensional space.

8. The method of claim 5 where said step of determining considers whether there exist squares in said set of squares identified in step (a) that are not also founding said set of squares identified in step (b), and vice versa.

9. The method of claim 5 where said step (b) is executed by operating on a signal received from each of one or more signal sources that arc physically coupled to said second object.

10. The method of claim 9 where said step (d) is executed whenever a new signal is received from said one or more signal sources of said second object.

11. The method of claim 10 where said signal received from each of said one or more signal sources is received in response to an interrogation of said one or more signal sources.

12. The method of claim 9 where said step (a) is executed by operating on a signal received from each of one or more signal sources that are physically coupled to said first object, and said step (d) executed whenever a new signal is received from said one or more signal sources of said second object or, inclusively, from said one or more signal sources of said first object.

13. The method of claim 5 where said step of determining employs an algorithm that focuses on change in said interaction space of said first object indicative of movement of said first object, and change in said interaction space of said second object indicative of movement of said second object, in order to determine whether spatial relationship between said first object and said second object changes in character.

14. The method of claim 5 where said step (b) comprises repeatedly interrogating one or more signal sources that are coupled to said second object.

15. The method of claim 14 where said step (a) comprises repeatedly interrogating one or more signal sources coupled to said first object.

16. The method of claim 5 further comprising a step of taking action said step of determining ascertains that said spatial relationship changes state, from a null interaction to a non-null intersection, or vice versa.

17. The method of claim 16 where said first object is a computer terminal, and said second object is an object carried by a person.

18. The method of claim 17 where said action relates to providing computing services to said person.

19. A method comprising the steps of:
  (a) obtaining static information about objects in a location;
  (b) receiving information relating to position of said objects and interrogating said objects by pinging said objects with an active signal from a set of signals that includes ultrasound;
  (c) calculating maximum cover for at least some of said objects to obtain a set of quadtree cells for each of said objects;
  (d) ascertaining containment/overlapping index for each of said sets of quadtree cells; and
  (e) updating a memory with said ascertained indices.

20. The method of claim 19 further comprising a process of repeating steps (b) through (d).

21. The method of claim 19 further comprising a process of executing a predetermined program related to a first object, in a second object that comprises a processor, when the index associated with said second object indicates that the quadtree cells set associated with said first object contains, is contained by, or overlaps, the quadtree cells set associated with said second object.

* * * * *